United States Patent
Roeschlein et al.

[15] 3,656,096
[45] Apr. 11, 1972

[54] DIGITAL DELAY TIME COMPRESSION CIRCUIT

[72] Inventors: Eugene R. Roeschlein; Donald C. Weiss; David L. Zeph, all of Indianapolis, Ind.

[73] Assignee: The United States of America as represented by the Secretary of the Navy

[22] Filed: May 7, 1970

[21] Appl. No.: 35,377

[52] U.S. Cl. .................340/5 R, 324/77 R, 324/77 D, 340/6 R, 343/5 DP
[51] Int. Cl. .................................................G01r 23/00
[58] Field of Search.................324/77 R, 77 A, 77 B, 77 D, 324/77 G, 77 H; 343/5 DP, 100 CL; 340/3, 5, 6

[56] References Cited

UNITED STATES PATENTS

| | | | |
|---|---|---|---|
| 3,046,545 | 7/1962 | Westerfield | 343/5 DP |
| 3,182,283 | 5/1965 | Ellingson et al. | 340/6 R |
| 3,337,800 | 8/1967 | Halley et al. | 324/77 D |

*Primary Examiner*—Richard A. Farley
*Attorney*—R. S. Sciascia and H. H. Losche

[57] ABSTRACT

A digital delay time compression circuit (DELTIC) having a shift register to produce a 512 bit delay with an input from an AND-OR gating circuit to sample hydrophone data and recirculate this data in the shift register, or optionally through a one-bit flip-flop delay, to produce delayed and compressed digital words of 512 or 513 bits on an output thereof for correlation with other hydrophone data, and enabling and blocking pulse means applied to the AND-OR gating circuits to pass test words to periodically test the DELTIC for proper operation.

5 Claims, 4 Drawing Figures

INVENTORS
EUGENE R. ROESCHLEIN
DONALD C. WEISS
DAVID L. ZEPH
BY
H. H. Losche
ATTORNEY

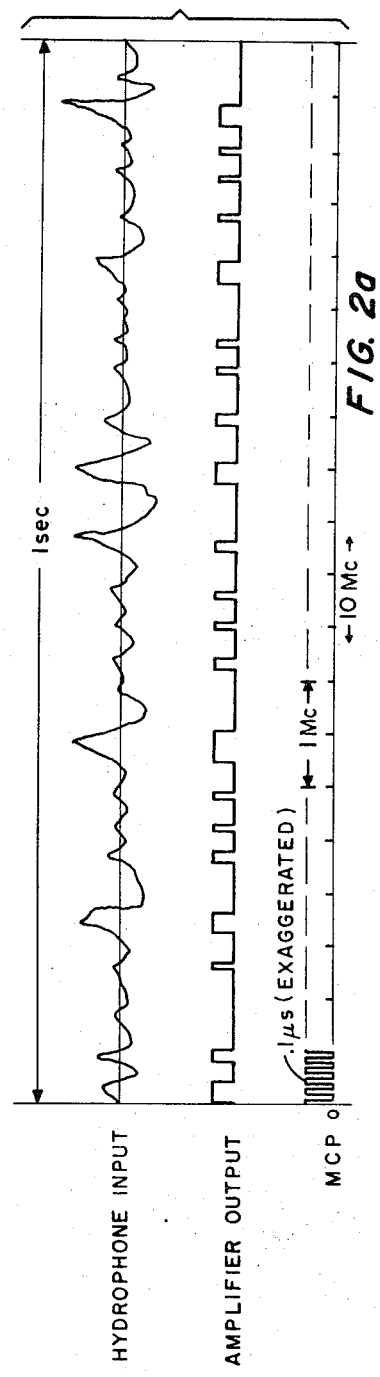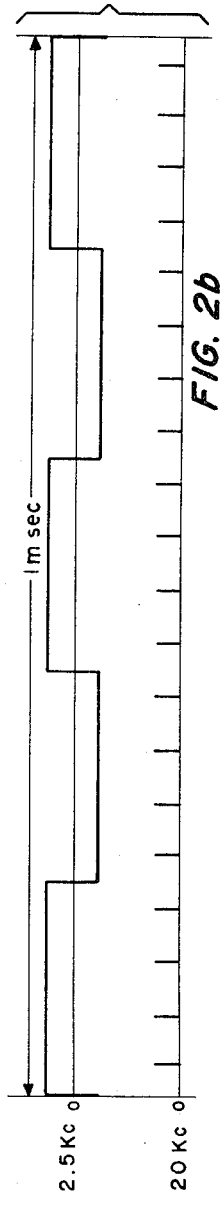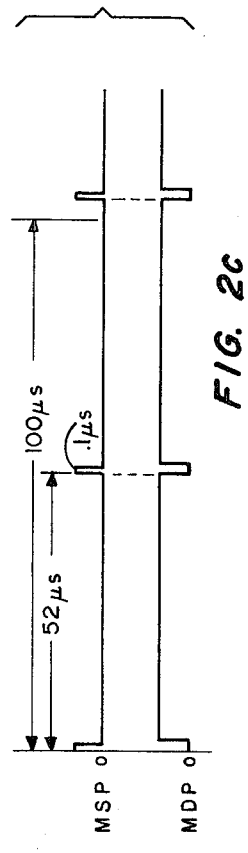

DIGITAL DELAY TIME COMPRESSION CIRCUIT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to digital storing and readout systems and more particularly to digital delay time signal compression circuits for delaying and comparing the received signals of a plurality of hydrophones placed to vector on a target.

Prior known DELTICs were of circuits using analog voltages delayed through acoustic delay lines of glass, quartz, mercury, or metal. The prior known devices also use magnetic tape and magnetic drums to store voltage signals for later readout and comparison.

SUMMARY OF THE INVENTION

In this invention a DELTIC circuit is used to process the signals coming from a hydrophone for the purpose of comparing with signals of other hydrophones in a sonar system for inner space target detection. In this invention of a DELTIC a digital shift register is used as the compressing and delaying element which includes eight stages of 64 bits to provide a binary delay of 512 bits. The input to the shift register is through an OR gate having the outputs of three AND gates applied through the OR gate. The first AND gate gates through the audio signals from one of the hydrophones in the sonar system, the second AND gate gates through binary word sequence for testing the shift register operation, and the third AND gate gates through the output of one of the shift register outputs for recirculation of the compressed binary word conducted through the register. The AND gates are enabled and disabled by the outputs of two precision monostable multivibrators, one of which is triggered at a clock frequency and the other of which is switched for test purposes. One bistable multivibrator receives the output of the shift register and also clock pulses to recirculate the shift register output back to the shift register input for one additional bit time delay compression of the input audio hydrophone signal for data processing and comparison with other hydrophone signals. The audio signal input is amplified and limited for sampling at the clock source frequency and serially gated into the shift register. The serial registration of the audio signals produces a compressed storage or delay of binary bits that are recirculated for comparison with other DELTIC registrations to identify word identities denoting a target. A sequence generator generates test words which are periodically gated into the shift register to check its operation The input of audio signals is also selective to switch in a known low frequency signal to check the sequential operation of the shift registers. It is accordingly a general object of this invention to provide a DELTIC to convert audio signals into time compressed binary bits which are stored or delayed and recirculated for data processing with other DELTIC signals.

BRIEF DESCRIPTION OF THE DRAWING

These and other objects and the attendant advantages, features, and uses will become more apparent to those skilled in the art as a more detailed description proceeds when considered along with the accompanying drawing, in which:

FIGS. 2a, 2b, and 2c, are waveforms of various points in the circuit of FIG. 1 given in different time scales.

DESCRIPTION OF THE PREFERRED EMBODIMENT

Figure 1:
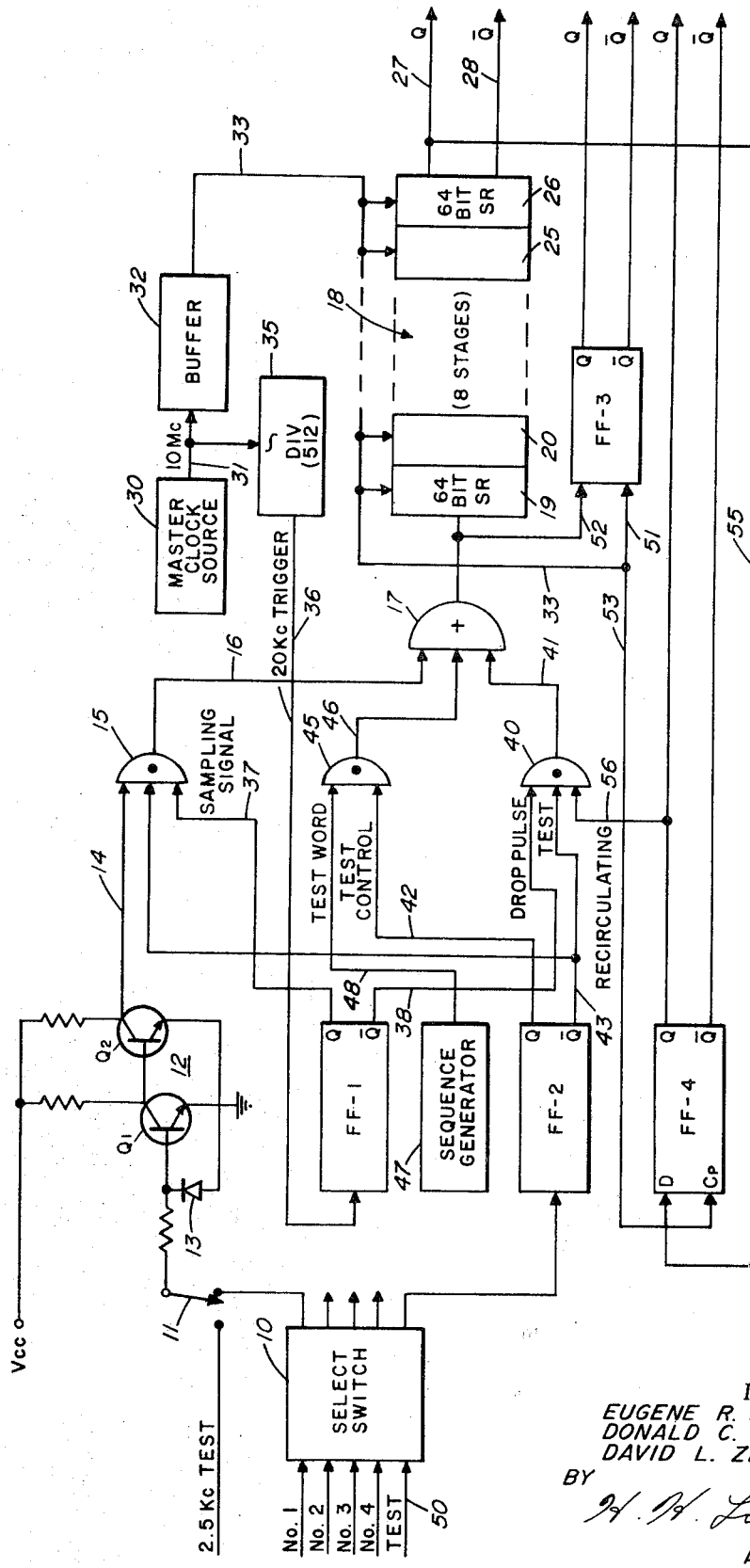
FIG. 1 is a block and circuit schematic of the DELTIC circuit of this invention.

Referring more particularly to FIG. 1 there is illustrated an input of a plurality of audio signals, such as hydrophone signals No. 1, No. 2, No. 3, and No. 4, to a select switch 10 for selecting the various hydrophone inputs to the DELTIC circuits of this invention. Using the information from hydrophone No. 1 the selector switch is controlled to conduct the audio signal of hydrophone No. 1 over the output conductor through a switch 11 to the input of a limiting amplifier 12. Limiting amplifier 12 eliminates all negative audio voltage swings by the diode 13 and amplifies and limits the positive audio voltage on the output 14 thereof. Output 14 of limiting amplifier 12 is conducted through an AND gate 15 by way of conductor means 16 to an OR gate 17 whenever the sampling signal on the AND gate 15 enables this gate, as will later be more fully described. The output of OR gate 17 is coupled as the input to a shift register 18 consisting of eight stages such as stages 19, 20, 25, and 26 and those in between consisting each of a 64-bit shift register. Shift register 18 is in module form which may be purchased on the open market and may be of a greater or lesser number of stages in accordance with the marketable items and as desired to meet the demands of application. Shift register 18 has two outputs 27 and 28, hereinafter referred to as the Q and $\bar{Q}$ outputs.

The DELTIC system is synchronized in its operation of the various elements from a master clock source 30 producing a 10 megacycle (Mc) output on the output conductor 31. The output 31 of the master clock source is conducted through a buffer circuit 32 by way of the conductor means 33 as a control input to each of the 64-bit shift registers 19 through 26. A first precision monostable multivibrator FF–1 has a control input produced by division of the 10 Mc master clock source through a division circuit 35 over the conductor means 36 to produce Q and $\bar{Q}$ outputs over the conductor means 37 and 38, respectively. The output 37 is coupled as a second input for the sample signals to the AND circuit 15. The second output 38 from the $\bar{Q}$ output is coupled as one input to an AND gate 40. The output 41 of AND gate 40 is coupled as a second input to the OR gate 17. A second precision monostable multivibrator FF–2 produces Q and $\bar{Q}$ outputs over the conductor means 42 and 43, the output 43 being a second input to the AND gate 40 and also to AND gate 15 to disable this gate to prevent sampled signals from passing to the register when the circuit is under test. The Q output 42 of FF-2 is coupled as a test control input to an AND gate 45. The output 46 of AND gate 45 is coupled as a third input to OR gate 17. A sequence generator 47 has an output 48 coupled as the second input to AND gate 45. The control input to the multivibrator FF–2 is from a test input source 50 to the select switch 10. A second input tap to the switch 11 has an audio signal of 2.5 kilocycles (kc) applied thereto such that the switch 11 can be switched to apply the hydrophone No. 1 audio input or the 2.5 kc audio input. A third bistable multivibrator FF–3 has the master clock source coupled thereto from the output conductor 33 and branch conductor 51 and a second input over the branch conductor 52 from the output of the OR gate 17. Bistable multivibrator FF–3 produces Q and $\bar{Q}$ outputs. A fourth multivibrator FF–4 has one input from the clock pulse source over the conductor means 33 and branch conductor 53 and has a second input coupled to the Q output 27 from the shift register 18 by way of conductor means 55 to the D terminal of FF–4. Multivibrator FF–4 produces Q and $\bar{Q}$ outputs, the Q output being coupled by way of conductor 56 as the third input to the AND circuit 40.

Illustrated in FIG. 2a is the hydrophone input shown in the top line of the one second scale being an audio signal similar to noise which may include target signals. The second line illustrates the amplified and limited audio signals produced on the output 14 of the limiter amplifier 12. The master clock source produces a 10 Mc frequency illustrated in the third line of the one second scale in which 1 Mc of the 10 Mc is illustrated by way of comparison and each pulse being shown is 0.1 microsecond ($\mu$s) which herein is exaggerated for the purpose of example.

In FIG. 2b the scale is shown to be 1 millisecond (msec) and the top line is the audio frequency input of 2.5 kc to switch 11 and the lower line is a 20 kc frequency produced on the output 36 from the frequency divider 35 to trigger the multivibrator FF-1. Accordingly, sampling pulses of 0.1 μs enable the AND circuit 15 for 0.1 μs in every 52 μs's, as more particularly illustrated in FIG. 2c under the 100 μs scale. For the 52 μs interval of time that the Q output on 37 is operative to disable AND gate 15, the $\bar{Q}$ output 38 applied to AND gate 40 enables this gate along with the $\bar{Q}$ output 43 from multivibrator FF-2 to recirculate any binary "1" signals from the Q output 27 of the shift register 18 through FF-4 in synchronism with the 10 Mc clock pulses applied over the conductor means 53. As may be realized, whenever the 0.1 μs sampling signal is applied over the conductor means 37 to enable AND gate 15, a drop pulse on the output 38 is applied to the AND gate 40 to disable this gate. Whenever it is desirable to test the shift register 18 operation, switch 11 may be switched to the known audio frequency of 2.5 kc which will cause sampling of the 2.5 kc signal, as shown in FIG. 2b, at the 20 kc sampling rate to cause four binary "1's" followed by four binary "0's" followed again by four binary "1's" in that order to be shifted down the shift register 18. The Q and $\bar{Q}$ outputs of the shift register 18 and the multivibrator FF-3 in data processing equipment to which they are connected indicate the correct or incorrect operation of shift register 18 from this 2.5 kc audio signal. Where it is desirable to place an actual test word into the shift register 18, the select switch 10 may be used to apply test input signal 50 to the multivibrator FF-2 to place a Q output pulse 42 on the AND gate 45 and a $\bar{Q}$ signal on the output 43 disabling AND gates 15 and 40 to conduct test words from the sequence generator 47 over its output 48 through AND gate 45 and over the conductor means 46 and the OR gate 17 to the shift register 18 to check the test word for exact reproduction of that word produced by the sequence generator 47.

Accordingly, the DELTIC of FIG. 1 will compress the audio signal from hydrophone No. 1 into a digital word in the shift register 18 which will accommodate up to 512 binary bits. As these binary bits of the word sequence emerge from the Q output 27 they are applied back through FF-4 and 56 through AND gate 40 and OR gate 17 to recirculate this information for 52 μs. Any new bits of information will be applied from hydrophone No. 1 through the limiting amplifier 12 and AND gate 15 and OR gate 17 every 52 μs for 0.1 μs time period of the sampling pulse. This recirculating feature of the DELTIC delays hydrophone audio signal information stored continuously and any new audio signal information is sampled and put into the shift register every 52 μs. The hydrophone audio signal information accordingly is stored in compressed binary form in 512 bits, increased to 513 bits by the FF-4 recirculation. Since the master clock source 30 and the frequency divider 35 and the number of storage bits in the shift register 18 are integrally related, the addition of FF-4 provides an additional bit of delay resulting in a precession of the stored data such that the newest data is placed along side of the next most recent data bit and the very oldest data bit is dropped.

While the frequencies given in the descriptive specification and shown on the drawing are in round figures for the purpose of example, the frequencies used in one practical application are as follows for time integrally related signals:

| Master Clock Frequency | 9.846 MHz |
| Sampling Frequency | 19.2305 kHz |
| Clock Pulse Width | 0.10156 μs |
| Drop Pulse Width | 51.2 μs |

The 2.5 kc audio test and the test signal 50 can be applied automatically at intervals of time to test the operation of the shift register or the DELTIC system as a whole to indicate any faults. The Q and $\bar{Q}$ outputs of the shift register 18, multivibrator FF-3, and the multivibrator FF-4 can be used in further data processing circuits to compare the delayed and stored hydrophone information with other DELTIC circuits to produce triangulation of a target or targets in the inner space area. The target signals are processed in completely digital form providing a very accurate delay time and these positive digital outputs are realized for use in correlating with similar outputs of other DELTIC circuits to a greater advantage than magnetic storage drums or magnetic tapes.

While many modifications and changes may be made in the constructional details of the DELTIC circuit to include more or less binary digital information, it is to be understood that the preferred embodiment disclosed herein represents the spirit of this invention as set forth in the scope of the appended claims.

We claim:

1. A digital delay time compression circuit comprising:
   a shift register of a plurality of stages having a single input and two outputs of alternate voltage signals;
   an OR gate in the input of said shift register;
   first, second, and third AND gates each having an output coupled as an input to said OR gate;
   first and second precision monostable multivibrators each having a control input and two alternate voltage outputs, one output of the first being to said first AND gate, the other output of the first being to said third AND gate, one output of said second multivibrator being to said second AND gate and the other output being to said third AND gate;
   first and second bistable multivibrators each having two inputs and two alternate voltage outputs, one input to said first bistable multivibrator being from the output of said OR gate and one input to said second bistable multivibrator being from one alternate voltage output of said shift register and one output to said third AND gate;
   a limiting amplifier having an input of audio signals and an output to said first AND gate;
   a sequence generator for repeatedly producing a binary test word sequence coupled as an input to said second AND gate; and
   a master clock source coupled to all stages of said shift register, to said first and second bistable multivibrators, and to said first monostable multivibrator through a frequency divider whereby audio signals are sampled at the rate of pulses produced on said first AND gate by said first monostable multivibrator triggered from said master clock source to apply said sampled audio signals through said first AND gate and OR gate to said shift register compressing said signals into binary bits, said registered signals being recirculated through said second bistable multivibrator to said shift register to cause delay storage of said signals for readout of said shift register and said first and second bistable multivibrators.

2. A digital delay time compression circuit as set forth in claim 1 wherein
   said limiting amplifier input includes a selector switch to select audio signals from an unknown target and audio signals of known frequency for testing the delay time compression circuit.

3. A digital delay time compression circuit as set forth in claim 2 wherein
   said shift register consists of eight stages of 64 bits and said second bistable multivibrator in circuit from said one alternate voltage of said shift register, said third AND gate, and said OR gate to said shift register providing said recirculated signals of 512 digital bits compressed for delay storage.

4. A digital delay time compression circuit as set forth in claim 3 wherein
   said first precision monostable multivibrator coupled from said master clock source through said frequency divider produces a low frequency alternately enabling said first and third AND gates constituting said two alternate voltage outputs to sample said audio signals and inhibit said third AND gate to inhibit recirculation of said binary bits and, in the other alternate voltage state, to inhibit said first AND gate thus inhibiting sampling voltages and to provide an enabling pulse to said third AND gate.

5. A digital delay time compression circuit as set forth in claim 4 wherein said second precision monostable multivibrator coupled to said second and third AND gates to provide alternate voltage outputs thereto provides an enabling voltage to said third AND gate to allow recirculation of said binary bits and alternately therewith enables said second AND gate to enable said binary word sequence to be placed in said shift register.

* * * * *